US005333483A

United States Patent [19]

Smith

[11] Patent Number: 5,333,483

[45] Date of Patent: Aug. 2, 1994

[54] BULL NOSE APPLICATOR

[76] Inventor: Steven W. Smith, 1077 NE. 35th St., Oakland Park, Fla. 33334

[21] Appl. No.: 68,574

[22] Filed: May 26, 1993

Related U.S. Application Data

[63] Continuation of Ser. No. 867,169, Apr. 10, 1992, abandoned.

[51] Int. Cl.[5] .......... B23P 11/00

[52] U.S. Cl. .......... 72/325; 29/243.5

[58] Field of Search .......... 72/325; 29/243.5, 243.57, 29/243.58, 21.1, 432.1, 432.2, 521

[56] References Cited

U.S. PATENT DOCUMENTS

| | | | |
|---|---|---|---|
| 345,687 | 7/1886 | Hayes | 72/325 |
| 2,178,187 | 10/1939 | Sake | 72/325 |
| 2,859,445 | 11/1958 | Larrabee | 72/325 |
| 2,944,262 | 7/1960 | Richman | 72/325 |
| 3,170,162 | 2/1965 | Balinski | 72/325 |
| 3,815,235 | 6/1974 | Marlar | 29/21.1 |
| 4,593,443 | 6/1986 | Wolford | 29/243.5 |
| 4,670,957 | 6/1987 | Wolford | 29/243.5 |
| 4,893,493 | 1/1990 | Jacques | 72/325 |
| 4,989,438 | 2/1991 | Simon | 72/325 |
| 5,040,400 | 8/1991 | Nastasi | 72/325 |

OTHER PUBLICATIONS

Goldblatt Tool Co. catalog, Drywall Tools and Accessories, Hammerhead Cornerbead Clincher, 1987, p. 83.

*Primary Examiner*—Daniel C. Crane
*Attorney, Agent, or Firm*—Malin, Haley, DiMaggio & Crosby

[57] ABSTRACT

An apparatus for applying a bull nose to adjacent dry wall panels, the apparatus comprising an elongated channel member having a bull nose application surface defined by a central, partially curved portion intersected by a pair of mutually perpendicular flat side portions, the channel member including a pair of transversely disposed slots proximal to one end thereof in which a pair of opposed crimping members are situated and pivotally attached to the channel member for rotation between a first, stored position and a second, crimping position, the crimping members each including a specially configured cutting surface defined by a curved planform having a compound curvature which tapers to a knife edge along symmetrical radii in, the apparatus further including a linkage mechanism attached tot he crimping members for reciprocating, the crimping members between the aforementioned first and second positions, respective, the linkage mechanism comprising a spring loaded anvil member which may be struck by a hammer or mallet, slidably disposed on an elongated rigid shaft attached to and extending outward from the channel member, and dual link pairs pivotally attached to the anvil member and the crimping members at opposite ends thereof, respectively.

4 Claims, 3 Drawing Sheets

BULL NOSE APPLICATOR

This is a continuation of copending application(s) Ser. No. 07/867,169 filed on Apr. 19, 1992, now abandoned.

BACKGROUND OF THE INVENTION

1. Field of the Invention

This invention relates generally to dry wall connections, and more particularly, to an apparatus for applying a bull nose corner to adjacent dry wall panels.

2. Description of the Prior Art

In modern construction, it is often desirable to apply a bull nose reinforcing strip to adjacent dry wall panels to add structural rigidity to the connection while providing an aesthetically pleasing appearance. Presently, bull nose strips are attached to the dry wall by either coating the underside of the flanges thereof with a thin coating of spackle or cement, or by nailing a plurality of nails through the flanges and into the dry wall at sufficiently spaced intervals. Both methods are labor intensive.

Devices for applying a corner bead to adjacent dry wall panels are known in the art and are of the type disclosed in U.S. Pat. No. 2,859,445 issued to Larrabee. The Larrabee patent discloses a clinching tool for aligning a corner bead with respect to the dry wall panels, and clinching areas of the corner bead flanges such that they locally deform and grip the dry wall. Goldblatt Tool Company manufactures a device known as a "Goldblatt Hammerhead Corner Bead Clincher," which includes an elongated V-shaped channel for aligning a corner bead with respect to adjacent dry wall panels, and a hammer or mallet actuated linkage which drives a pair of clinching jaws into the corner bead flanges to form localized deformations similar to those created by the Larrabee apparatus. Neither of these devices, however, are suitable for similarly installing a bull nose corner against such dry wall panels. Moreover, the geometric configuration of the crimping jaws in the Goldblatt tool does not provide a suitable deformation in the flange of the reinforcement strip to ensure permanent and secure attachment to the dry wall.

Therefore, there exists a need for a tool which facilitates the attachment of a bull nose reinforcement strip to adjacent dry wall panels with a specially configured crimping member which cuts the bull nose flanges into curved gripping tongues which optimizes the connection therebetween while minimizing the labor typically associated with such installations.

SUMMARY OF THE INVENTION

In accordance with the present invention, a bull nose applicator is disclosed, generally comprising an elongated channel member which includes a pair of pivotally attached crimping members, and a linkage mechanism connected to a spring-loaded anvil for reciprocating the crimping members between a first, stored position and a second, crimping position, by striking the anvil with a blow from a hammer or mallet.

The elongated channel member includes a bull nose application surface which conforms to the cross section of a bull nose, defined by a central, partially curved portion in the shape of a bull nose body intersected by a pair of mutually perpendicular and flat side portions which correspond to the bull nose side flanges. The channel member additionally defines a pair of transversely disposed slots proximal to one end thereof, each having a pivotally attached crimping member located therein which may rotate between the aforementioned first and second positions, respectively.

Each crimping member is a generally planar structure of nominal wall thickness defined by first and second ends, respectively. The first end includes a specially designed cutting surface for locally cutting and deforming a portion of the bull nose flange into a curved gripping tongue, which rigidly engages the dry wall material to prevent the flanges from sliding against the wall exterior, and/or pulling away from the wall surface. The cutting surface has a specially configured geometric orientation so that one portion of the gripping tongue is driven into the drywall material at an acute angle relative to the section of the bull nose and wall extending towards the bull nose corner, while other portions of the gripping tongue are conformed into opposing radial "fingers" which prevent vertical axial slippage against the wall exterior. The cutting surface is defined in planform by a partially curved knife edge which blends into a straight knife edge terminating at an apical juncture with a peripheral radius less than the radius defined by the distance between this apex and the pivot point of the cutting member, the peripheral radius having its center eccentrically disposed to the pivot point. In cross section, the knife edge is defined by the intersection of symmetrical radii which, when driven through the flange, form the radial fingers described in the foregoing.

The crimping members are pivoted by a reciprocating mechanism which comprises an elongated rigid shaft secured to, or unitarily formed in the channel member opposite the bull nose application surface. A tube member having an anvil at one end thereof is slidably disposed on the shaft atop a compression spring. A pair of diametrically opposed flanges extend outward from the tube member, each having a pair of pivotally attached link members which are pivotally attached at the opposite ends thereof to the second end of each crimping member.

To install a bull nose section to the dry wall, it is positioned against the dry wall exterior by orienting it within the channel member and pressing the channel member against the wall. A blow against the anvil from a hammer or mallet will bias the crimping members against the bull nose flanges, causing them to locally deform and grip the dry wall material. The compression spring will thereafter return the mechanism and the crimping members to the first, stored position. The process is subsequently repeated at desired longitudinal locations along the bull nose to provide a secure and even attachment to the dry wall.

In accordance with the instant invention, it is an object thereof to provide a device for securely attaching a bull nose to adjacent dry wall panels with a minimum of effort and time.

It is yet another object of the present invention to provide a device for securely attaching a bull nose to adjacent dry wall panels by striking a reciprocating crimping mechanism with a hammer or mallet.

It is yet another object of the instant invention to provide a device for securely attaching a bull nose to adjacent dry wall panels that is amenable to low cost manufacture.

In accordance with these and other objects which will become apparent hereinafter, the invention will now be described with particular reference to the accompanying drawings.

DESCRIPTION OF THE PREFERRED EMBODIMENT

With particular reference to the several views of the drawings, there is depicted an apparatus 10 for applying a bull nose 11 to adjacent dry wall panels 12*a* and 12*b*, generally comprised of an elongated channel member 14, a pair of crimping members 16*a* and 16*b* pivotally attached to channel member 14, respectively, and two pairs of link members 18*a* and 18*b*, and 20*a* and 20*b* pivotally connected at opposing ends thereof to crimping members 16*a* and 16*b* and spring-loaded anvil member 22, respectively, for reciprocating crimping members 16*a* and 16*b* between a first, stored position and a second, crimping position.

Figure 1:
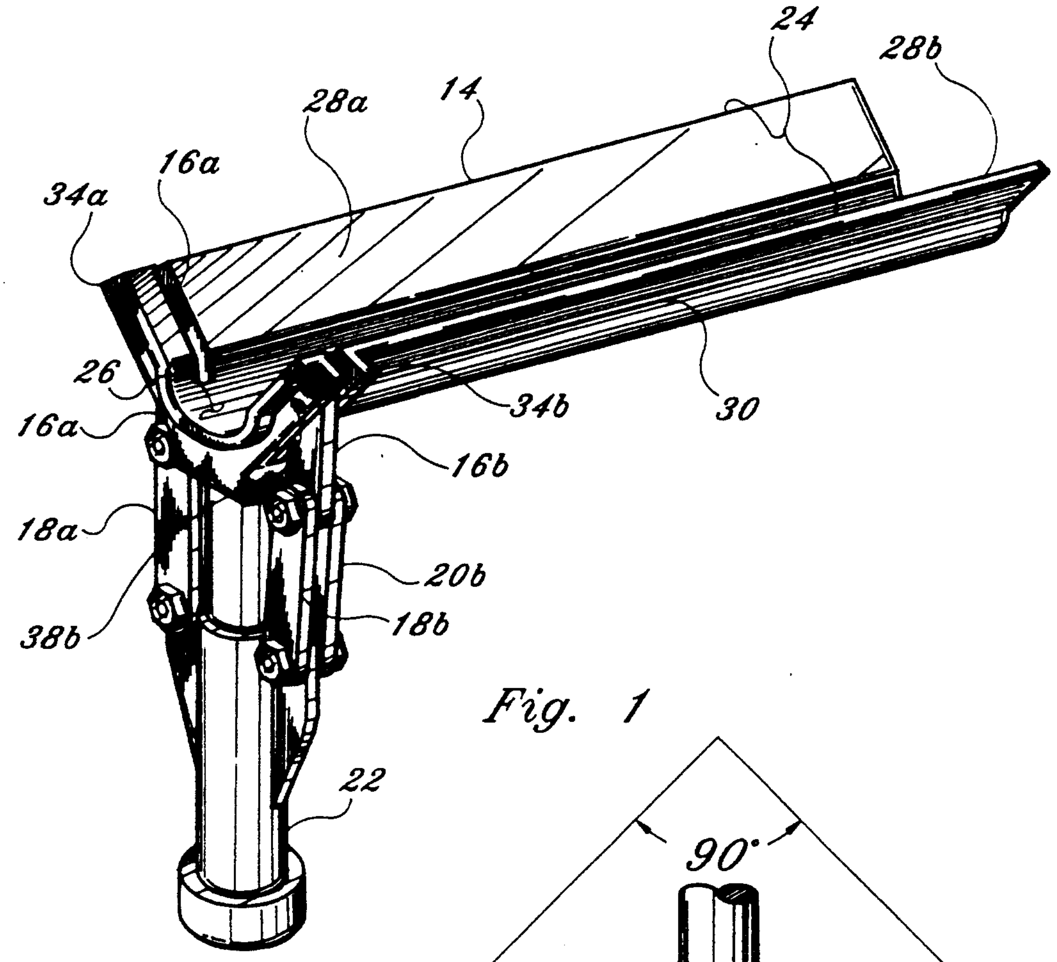
FIG. 1 is an isometric view of the bull nose applicator.
Figure 3A:
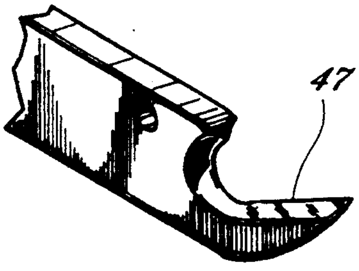
FIG. 3A is a perspective view of the crimping member of FIG. 3.
Figure 2:
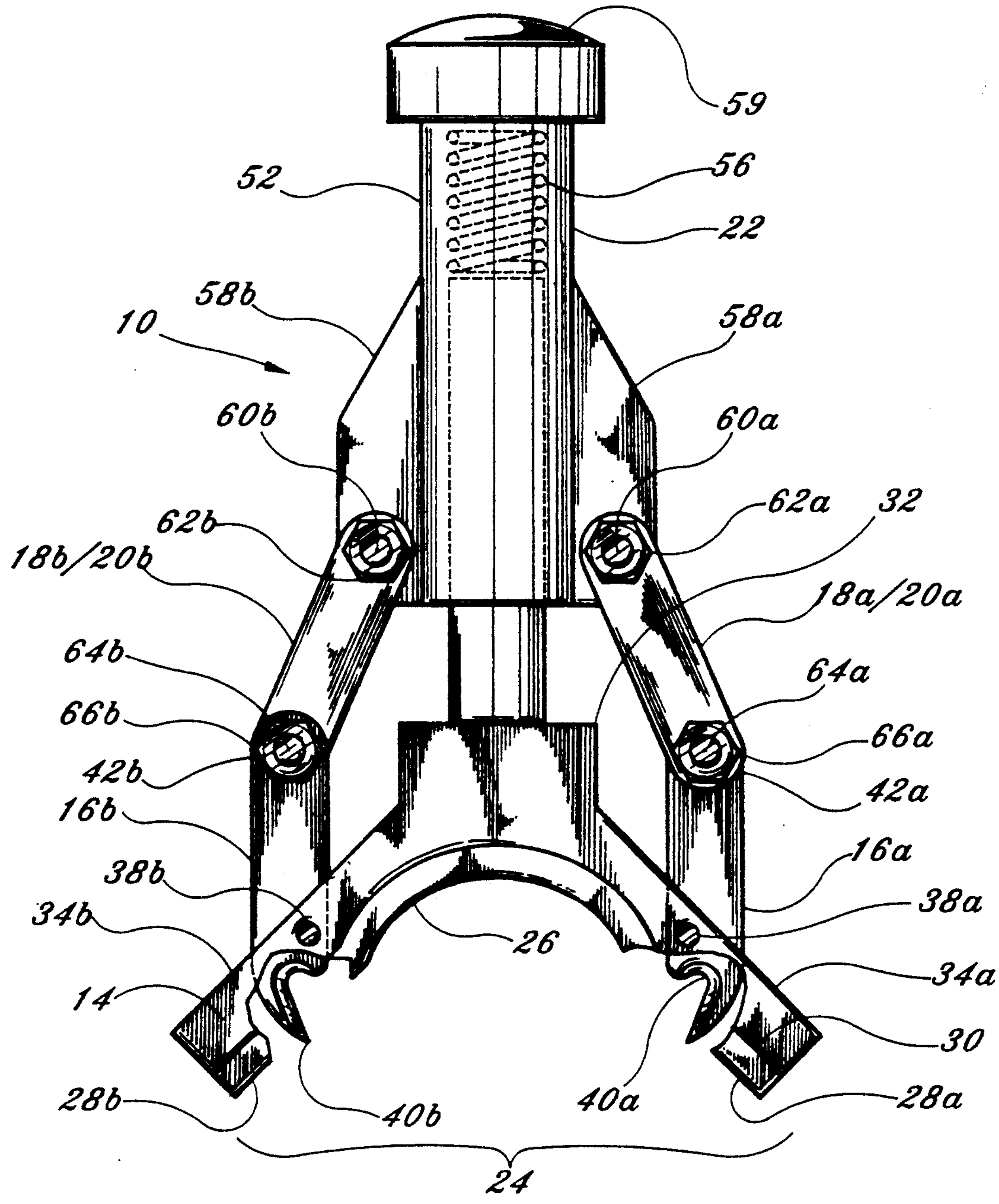
FIG. 2 is a frontal elevational view of the bull nose applicator.
Figure 3:
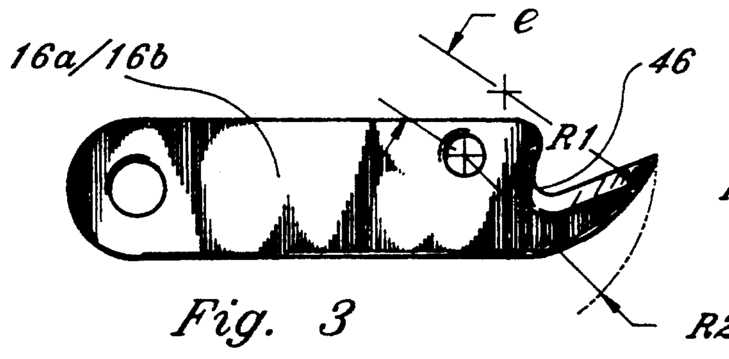
FIG. 3 is a detailed plan view of a typical crimping member.

Referring now to FIGS. 1, 2 and 3, channel member 14 includes a bull nose application surface 24 which conforms to the cross section of a bull nose 11, defined by a central, partially curved portion in the shape of a bull nose body 26 intersected by a pair of mutually perpendicular and flat side portions 28*a* and 28*b* which correspond to the bull nose side flanges. Channel member 14 is additionally defined by an outer surface 30 which terminates at one end thereof in a raised shoulder portion 32 which blends into "Y-shaped" legs 34*a* and 34*b*. Legs 34*a* and 34*b* each define a pair of transversely disposed slots 36*a* and 36*b*, respectively, therethrough. Crimping members 16*a* and 16*b* are situated within slots 36*a* and 36*b*, and are pivotally attached to channel member 14 by roll pins 38*a* and 38*b*, respectively.

Figure 5:
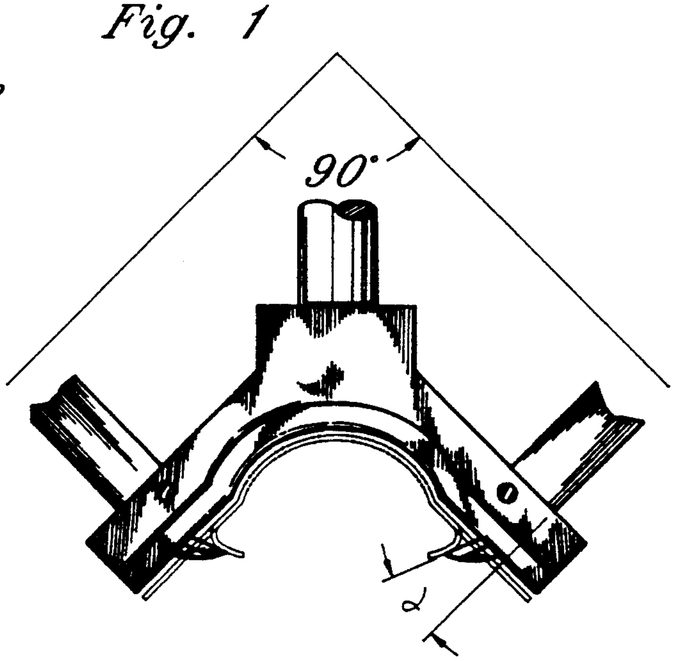
FIG. 5 is a frontal elevational view of the crimping members extended into the crimping position.
Figure 4:
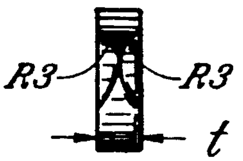
FIG. 4 is an end view of a typical crimping member.
Figure 7:
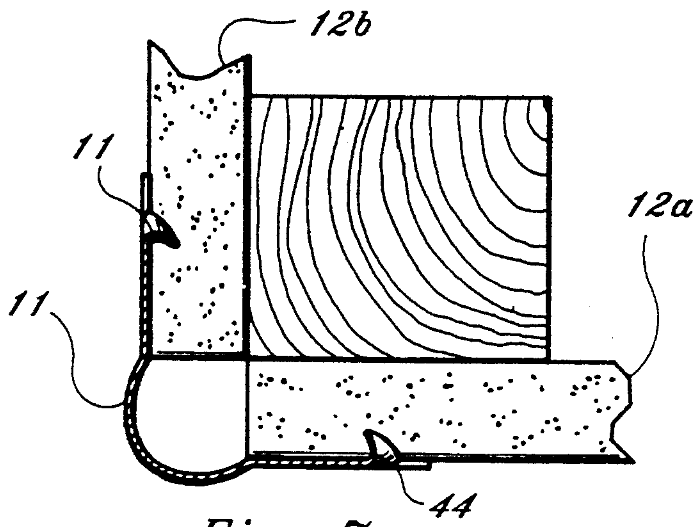
FIG. 7 is a sectional view of the bull nose secured to adjacent dry wall panels.
Figure 8:
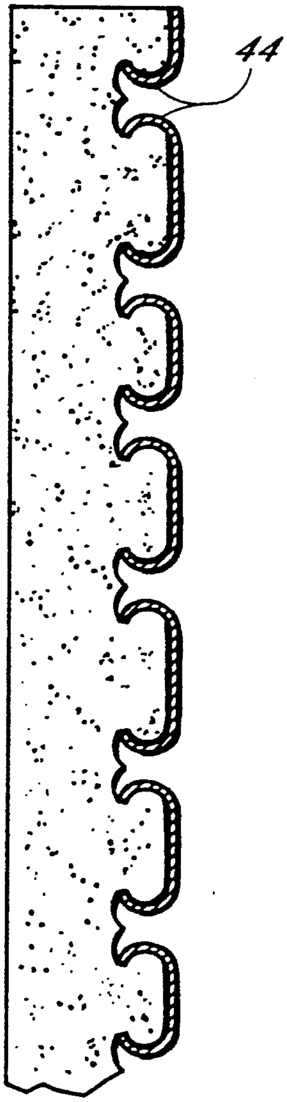
FIG. 8 is a side elevational view in cross section partially cut away.

Referring to FIGS. 2, 3 and 4 each crimping member 16*a* and 16*b*, is a generally planar structure having a nominal wall thickness t defined by respective first and second ends 40*a* and 42*a*, and 40*b* and 42*b*. FIG. 3 is an end view of crimping member 16*a* which illustrates the cutting surface common to both crimping members 16*a* and 16*b*. First ends 40*a* and 40*b* each include a specially designed cutting surface for locally cutting and deforming a portion of the bull nose flange into a curved gripping tongue 44 as depicted in FIGS. 5 and 7, which rigidly engages the dry wall material of panels 12*a* and 12*b*. Each cutting surface is defined in planform by a partially curved knife edge 46 which blends into a straight knife edge 47 terminating at an apical juncture 49 with a peripheral radius R1 less than the radius R2 defined by the distance between apex 49 and pivot points 38*a* or 38*b*, the peripheral radius having its center eccentrically disposed to the pivot points, respectively. In cross section, knife edges 46 and 47 are defined by the intersection of continuous symmetrical radii R3 which, when driven through the flanges of bull nose 11, form radial fingers typically denoted by the reference numeral 49 as shown in FIG. 8. The respective cutting surfaces pierce the flanges of bull nose 11 at an acute angle equal to $90° - \alpha$ relative to the sections of bull nose 11 extending towards the bull nose corner when biased into the second, crimping position as illustrated in FIGS. 5 and 7.

Crimping members 16*a* and 16*b* are pivoted into the crimping position by a reciprocating mechanism comprised of an elongated rigid shaft 50 secured to, or integrally formed with, shoulder portion 32 as best illustrated in FIG. 2. An anvil member 22 having a partially hollow body portion 52 and an anvil 54 is slidably disposed on shaft 50 on top of compression spring 56. Body portion 52 defines a pair of diametrically opposed integral flanges 58*a* and 58*b*. Flanges 58*a* and 58*b* each have a pair of link members 18*a* and 20*a*, and 18*b* and 20*b* pivotally attached thereto by bolts 60*a* and 60*b* and lock nuts 62*a* and 62*b*, respectively, in a clevis type arrangement. Link members 18*a* and 20*a* are pivotally attached at the opposite ends thereof to second end 42*a* of crimping member 16*a* by bolt 64*a* and lock nut 66*a*, and link members 18*b* and 20*b* are similarly attached to second end 42*b* of crimping member 16*b* by bolt 64*b* and lock nut 66*b*.

Figure 6:
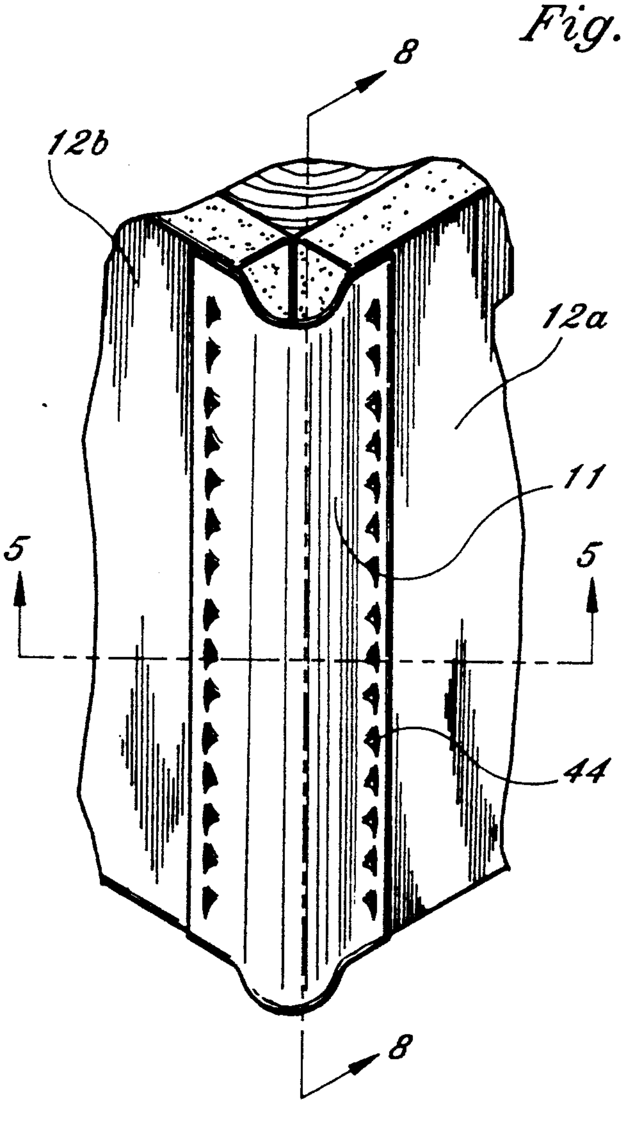
FIG. 6 is an isometric view of a bull nose secured to adjacent dry wall panels.

Referring now to FIGS. 6 and 7, to install bull nose 11 against a pair of adjacent dry wall panels 12*a* and 12*b*, it is first positioned against the dry wall exterior by simultaneously positioning it flush against application surface 24 of channel member 14. While holding the channel member 14 firmly in place, a blow from a hammer or mallet against anvil 54 will bias crimping members 16*a* and 16*b* through link members 18*a* and 20*a*, and 18*b* and 20*b*, respectively, into the flange portions of bull nose 11, causing them to locally deform into gripping tongues 44, which grip the dry wall material in panels 12*a* and 12*b*. Compression spring 56 will return the mechanism to its original position such that the process may be subsequently repeated at adjacent longitudinal locations along bull nose 11 to ensure a solid fit and trim appearance.

The present invention has been described in what is considered to be the most practical and preferred embodiment. It is recognized, however, that departures may be made therefrom, and that obvious modifications will occur to a person skilled in the art.

I claim:

1. An apparatus for applying a bull nose corner bead to adjacent dry wall panels, the bull nose corner bead having a curved position, comprising:
   - an elongated channel member having a bull nose application surface defined by a central, partially curved portion intersected by a pair of mutually perpendicular flat side portions, said curved portion of the channel member sized corresponding to the curved portion of the bull nose corner bead, said channel member including a pair of transversely disposed slots near one end thereof;
   - a pair of opposed crimping members disposed within said slots and pivotally attached to said channel member, said crimping members comprising a generally planar structure of nominal wall thickness defined by first and second ends, respectively, said first end including a cutting surface defined in planform by a partial curved knife edge which blends into a straight knife edge terminating at an apical juncture with a peripheral curve surface extending from the apical juncture and having a peripheral radius less than the radius defined by the distance between said apical juncture and said pivotal connection between said crimping member and said channel member, said peripheral radius having a center eccentrically disposed relative to said pivotal connection, said partially curved and straight knife edges defined in cross section by the intersection of symmetrical radii, and further whereby said crimping members may pivot between a first, stored position and a second, crimping position, said crimping members able to cut and deform a portion of said perpendicular flat side portions in a plurality of directions into the dry wall to provide a sufficient bond between the bull nose corner bead and the dry wall; and means for reciprocating said crimping members between said first and second positions, respectively, whereby said bull nose corner bead may be placed and oriented against said adjacent dry wall panels and secured thereto by successively reciprocating said crimping members between said first and second positions along varying longitudinal locations thereof, thereby forming a plurality of gripping tongues in said bull nose corner bead which locally cut, deform and engage said dry wall panels, each of said gripping tongues cut, deform and engage said dry wall panels.

2. The apparatus for applying a bull nose to adjacent dry wall panels as recited in claim 1, wherein said means for reciprocating comprise:

an elongated rigid shaft secured to said channel member opposite said bull nose application surface;

a tube member defining an outer surface and a hollow bore partially extending therethrough from an open first end to a closed second end, said second end having an integral anvil associated therewith, said tube member having a pair of diametrically opposed flanges integral with said outer surface thereof, said tube member slidably disposed on said elongated shaft;

a compression spring disposed between said closed second end of said tube member and said shaft; and a pair of planar linkage members pivotally attached to each of said tube member flanges, and said crimping members at said second end thereof.

3. An apparatus for applying a bull nose to adjacent dry wall panels, comprising:

an elongated channel member having a bull nose application surface defined by a central, partially curved portion non-tangentially intersected by a pair of mutually perpendicular, flat side portions, said channel member including a pair of transversely disposed slots near one end thereof;

a pair of opposed crimping members disposed within said slots and pivotally attached to said channel member, whereby said crimping members may pivot between a first, stored position and a second, crimping position, said crimping members each comprising a generally planar structure of nominal wall thickness defined by first and second ends, respectively, said first end including a cutting surface defined in planform by a partially curved knife edge which blends into a straight knife edge terminating at an apical juncture with a peripheral curved surface extending from the apical juncture and having a peripheral radius less than the radius defined by the distance between said apical juncture and said pivotal connection between said crimping member and said channel member, said peripheral radius having a center eccentrically disposed relative to said pivotal connection, said crimping members able to cut and deform a portion of said perpendicular flat side portions in a plurality of directions, into the dry wall, to provide a sufficient bond between the bull nose corner bead and the dry wall;

means for reciprocating said crimping members between said first and second positions, respectively, said means for reciprocating comprising an elongated rigid shaft secured to said channel member opposite said bull nose application surface;

a tube member defining an outer surface and a hollow bore partially extending therethrough from an open first end to a close second end, said second end having an integral anvil associated therewith, said tube member having a pair of diametrically opposed flanges integral with said outer surface thereof, said tube member slidably disposed on said elongated shaft;

a compression spring disposed between said closed second end of said tube member and said shaft; and a pair of planar linkage members pivotally attached to each of said tube member flanges, and said crimping members at said second end thereof, whereby said bull nose may be placed and oriented against said adjacent dry wall panels and secured thereto by successively reciprocating said crimping members between said first and second positions along varying longitudinal locations thereof, thereby forming a plurality of gripping tongues in said bull nose which locally deform and engage said dry wall panels, each of said gripping tongues cut, deformed and engaging said dry wall panels.

4. The apparatus of claim 3 wherein the bull nose corner bead has a curved portion and said curved portion of the channel member is sized corresponding to the cured position of the bull nose corner bead.

* * * * *